June 2, 1925.

R. E. McCRAY

DENTAL MIRROR

Filed Jan. 29, 1924

WITNESSES:

INVENTOR,
R. E. McCray.
BY
ATTORNEYS.

June 2, 1925.  1,540,409
R. E. McCRAY
DENTAL MIRROR
Filed Jan. 29, 1924   2 Sheets-Sheet 2
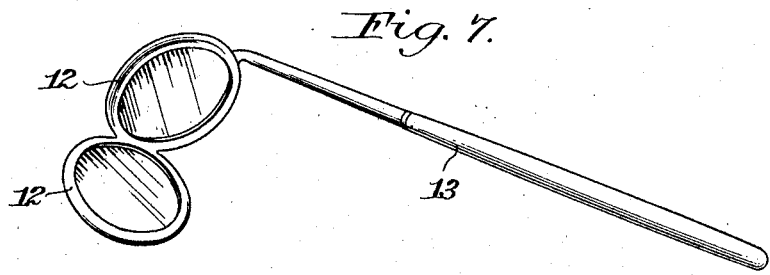
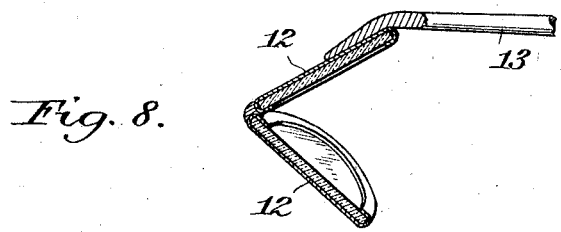
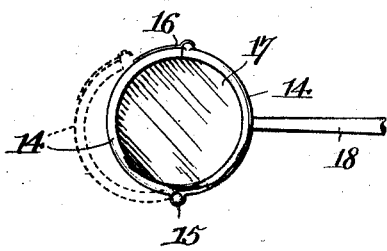 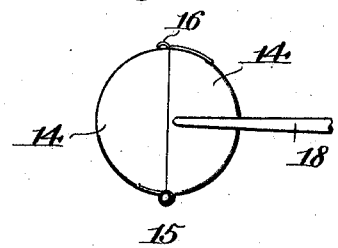
WITNESSES:
INVENTOR,
R. E. McCray.
BY
ATTORNEYS Patented June 2, 1925.

1,540,409

UNITED STATES PATENT OFFICE.

RICHARD EARL McCRAY, OF FAIRMONT, WEST VIRGINIA.

DENTAL MIRROR.

Application filed January 29, 1924. Serial No. 689,337.

*To all whom it may concern:*

Be it known that I, RICHARD E. McCRAY, a citizen of the United States, and a resident of Fairmont, in the county of Marion and State of West Virginia, have invented a new and Improved Dental Mirror, of which the following is a full, clear, and exact description.

This invention relates to improvements in dental mirrors, and more particularly to a double vision mirror, an object of the invention being to provide a pair or plurality of mirrors so connected and supported by a suitable handle that access to ordinarily inaccessible places in the mouth can be had with a clear vision, and also in which the device will act as a cheek guard so that the work of the dentist is facilitated.

A further object is to provide a double vision mirror in which individual mirrors are supported at an angle to each other at any desired adjustment, and which are provided with means for separably connecting a supporting handle thereof at different positions on the mirror or mirrors, in accordance with the use to which the mirror is to be put.

In the accompanying drawings—

Figures 7, 8 and 9, 10 are views of other modifications.

Figure 1:
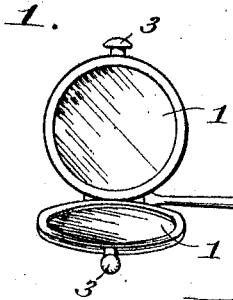
Figure 1 is a view in elevation illustrating one form of my improved dental mirror.
Figure 2:
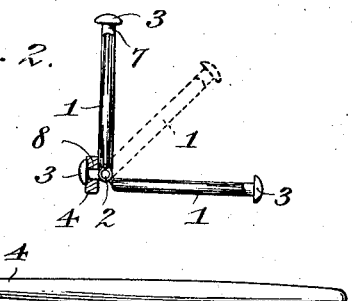
Figure 2 is a view in elevation at right angles to Figure 1, showing the handle in section.
Figure 3:
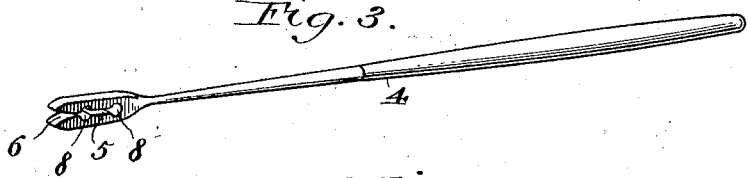
Figure 3 is a perspective view of the handle.
Figure 4:
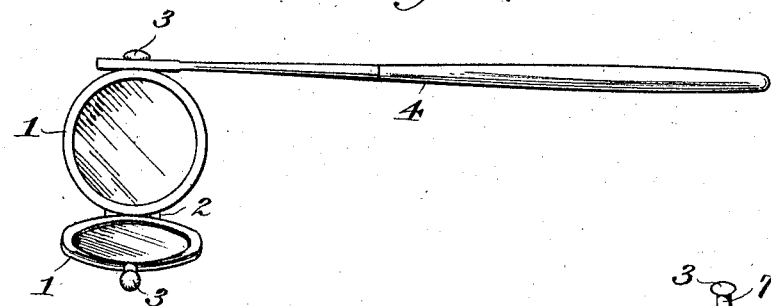
Figure 4 is a view similar to Figure 1, showing the handle in a different position relative to the mirror.

Referring particularly to Figures 1, 2, 3 and 4, 1, 1 represent a pair of dental mirrors which are connected by a hinge 2 and are provided at the hinge with a headed stud 3 and at their free edges with similar headed studs 3. 4 represents a handle which is provided at one end with a longitudinal slot 5 having a flared entrance 6 to receive the shanks 7 of the studs 3 and guide said shanks into any of a plurality of openings 8 in the handle. It will be noted, by reference to Figures 1 and 2, that this handle may be operatively coupled to the stud 3 at the hinge 2, or, as shown in Figure 4, may be connected to one of the studs 3 at the free edge of one of the mirrors. This enables the dentist to place the handle with relation to the mirrors in accordance with the work to be visualized and gives him a wide latitude for most efficient performance.

Figure 5:
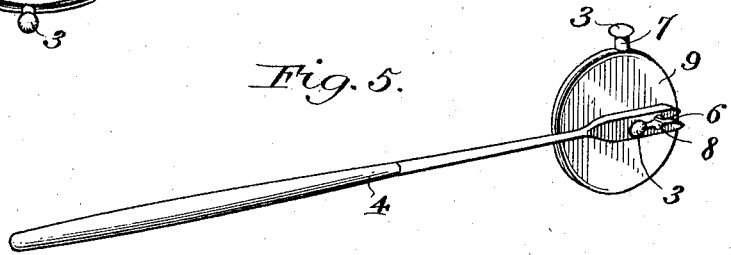
Figure 5 is a perspective view showing my improvements in connection with a single member.

In Figure 5 I illustrate a single mirror 9 having a stud 3 at its back and a stud 3 at its edge, either of which may receive the end of the handle 4, as will be readily understood.

Figure 6:
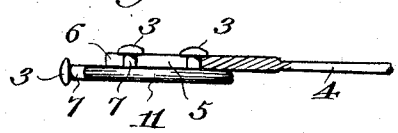
Figure 6 is a fragmentary view in longitudinal section illustrating a modification.

In Figure 6 I illustrate a single mirror 11 having a pair of studs 3 at the back thereof and a stud 3 at one edge so that the handle 4 may be rigidly coupled to the pair of studs at the back, as clearly shown.

In Figures 7 and 8 I show a pair of mirrors 12 which are angularly disposed and fixedly disposed relative to each other, with a handle 13 fixedly connected to one of the mirrors.

In Figure 9, I illustrate a dental mirror in which the frame 14 of the mirror is in two sections hingedly connected as shown at 15 and having a spring catch as shown at 16 so that this frame can be opened and closed to secure the mirror 17 and permit other mirrors to be inserted as occasion may require. The handle 18 is fixedly connected to one of the mirror sections.

It will be noted that with my improved duplex mirror or double vision mirror I not only can observe a tooth from two sides but I am enabled to hold back the cheek and to have a full, clear vision of the tooth so as to facilitate work thereon.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A device of the character described, comprising a pair of mirrors hingedly connected, headed studs on the free ends of the mirrors and at a point adjacent the hinge thereof, a handle having a longitudinally slotted end with a flared entrance thereto, and having a pair of openings in the slotted portion adapted to receive the headed stud in either of them.

2. As a new article of manufacture, a dental mirror and a handle therefor, and means for removably coupling the handle to the mirror whereby the handle may be positioned at the back or at the edge of the mirror.

RICHARD EARL McCRAY.